United States Patent [19]

Bergmann et al.

[11] Patent Number: 4,820,809
[45] Date of Patent: Apr. 11, 1989

[54] HETEROCYCLIC AZO DYES

[75] Inventors: Udo Bergmann, Darmstadt; Erwin Hahn, Heidelberg; Guenter Hansen, Ludwigshafen, all of Fed. Rep. of Germany

[73] Assignee: BASF Aktiengesellschaft, Ludwigshafen, Fed. Rep. of Germany

[21] Appl. No.: 144,648

[22] Filed: Jan. 11, 1988

Related U.S. Application Data

[63] Continuation of Ser. No. 4,826, Jan. 12, 1987, abandoned, which is a continuation of Ser. No. 758,450, Jul. 24, 1985, abandoned.

[30] Foreign Application Priority Data

Jul. 24, 1984 [DE] Fed. Rep. of Germany ....... 3427201

[51] Int. Cl.$^4$ .............................................. C09B 29/36
[52] U.S. Cl. ..................................... 534/765; 534/733; 8/691
[58] Field of Search ................ 534/733, 753, 765, 795

[56] References Cited

U.S. PATENT DOCUMENTS

| | | | |
|---|---|---|---|
| 3,635,955 | 1/1972 | Hansen et al. | 534/751 X |
| 3,876,621 | 4/1975 | Hagen et al. | 534/788 X |
| 3,919,188 | 11/1975 | Hagen et al. | 534/731 X |
| 4,041,025 | 8/1977 | Maier et al. | 534/777 X |
| 4,119,621 | 10/1978 | Hansen et al. | 534/733 |
| 4,207,233 | 6/1980 | Seybold et al. | 534/795 X |
| 4,250,090 | 2/1981 | Eilingsfeld et al. | 534/733 X |
| 4,496,480 | 1/1985 | Bergmann et al. | 534/765 X |
| 4,505,856 | 3/1985 | Buhler et al. | 534/765 X |
| 4,619,992 | 10/1986 | Bergmann et al. | 534/733 |
| 4,668,775 | 5/1987 | Bergmann et al. | 534/765 |
| 4,751,288 | 6/1988 | Bergmann et al. | 534/753 X |
| 4,764,600 | 8/1988 | Bergmann et al. | 534/795 X |

FOREIGN PATENT DOCUMENTS

| | | |
|---|---|---|
| 3328642 | 2/1985 | Fed. Rep. of Germany ...... 534/765 |
| 152957 | 8/1984 | Japan .................................... 534/765 |
| 2004561 | 4/1979 | United Kingdom . |
| 1583377 | 1/1981 | United Kingdom . |

Primary Examiner—Chables F. Warren
Assistant Examiner—Carolyn Greason
Attorney, Agent, or Firm—Oblon, Fisher, Spivak, McClelland & Maier

[57] ABSTRACT

Novel compounds of the general formula I

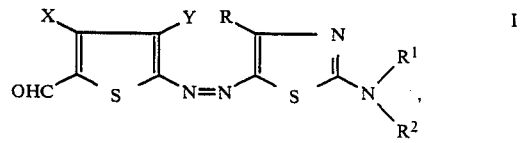

where X is hydrogen, nitro or unsubstituted or substituted alkyl, alkenyl, cycloalkyl, aryl or hetaryl, Y is cyano, nitro, alkanoyl, aroyl, alkylsulfonyl, arylsulfonyl, carboxyl, a carboxylic ester group or unsubstituted or substituted carbamyl, R is unsubstituted or substituted alkyl or aryl, $R^1$ is hydrogen or $R^2$, and $R^2$ is unsubstituted or substituted alkyl, alkenyl, cycloalkyl, aralkyl or aryl, are useful for dyeing textile fibers, in particular polyesters.

8 Claims, No Drawings

HETEROCYCLIC AZO DYES

This application is a continuation of application Ser. No. 004,826, filed on Jan. 12, 1987, now abandoned, which is a continuation of application Ser. No. 758,450, filed July 24, 1985.

The present invention relates to compounds of the general formula:

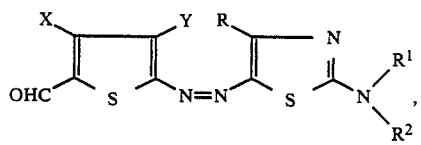
I where X is hydrogen, nitro or unsubstituted or substituted alkyl, alkenyl, cycloalkyl, aryl or hetaryl, Y is cyano, nitro, alkanoyl, aroyl, alkylsulfonyl, arylsulfonyl, carboxyl, a carboxylic ester group or unsubstituted or substituted carbamyl, R is unsubstituted or substituted alkyl or aryl, $R^1$ is hydrogen or $R^2$, and $R^2$ is unsubstituted or substituted alkyl, alkenyl, cycloalkyl, aralkyl or aryl.

X is hydrogen or, for example, $C_1$–$C_8$-alkyl which may be substituted by chlorine, bromine or phenyl, or thienyl, furyl or phenyl which is unsubstituted or substituted by chlorine, bromine, methyl, ethyl, methoxy, ethoxy or nitro.

Specific examples of alkyl radicals are: $CH_3$, $C_2H_5$, $C_3H_7$, $C_4H_9$, $C_5H_{11}$, $C_6H_{13}$, $C_8H_{17}$ and

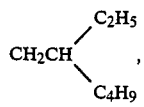

the abbreviated formula also embracing the n- and isoradicals. Specific examples of radicals Y in addition to those stated above are: $CH_3CO$, $C_2H_5CO$, $C_3H_7CO$, $C_4H_9CO$, $C_5H_{11}CO$, $C_7H_{15}CO$,

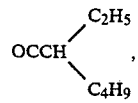

$C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, $COOCH_3$, $COOC_2H_5$, $COOC_3H_7$, $COOC_4H_9$, $COOC_6H_{13}$, $COOC_8H_{17}$,

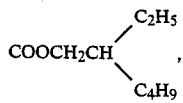

$COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(C_2H_5)_2$, $CON(C_4H_9)_2$,

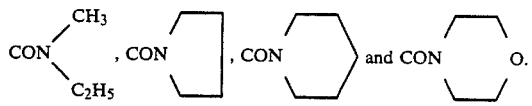

R is, for example, $C_1$–$C_4$-alkyl, $C_1$–$C_4$-alkoxycarbonylmethyl, cyanomethyl, benzyl or phenyl which is mono-substituted or polysubstituted by $C_1$–$C_{10}$-alkyl, $C_1$–$C_{10}$-alkoxy, phenoxy, benzyloxy, phenyl, chlorine, bromine, nitro, $C_1$–$C_4$-alkoxycarbonyl, $C_1$–$C_4$-mono- or dialkylamino, $C_1$–$C_4$-alkoxyethoxy, $C_1$–$C_4$-alkylmercapto, phenylmercapto or $C_1$–$C_5$-alkanoylamino, such as acetylamino, propionylamino, butyrylamino or valerylamino.

In addition to the radicals stated above, $R^2$ is, for example, $C_1$–$C_6$-alkyl which may be substituted by chlorine, bromine, hydroxyl, $C_1$–$C_8$-alkoxy, phenoxy, cyano, carboxyl, $C_1$–$C_8$-alkanoyloxy, $C_1$–$C_8$-alkoxy-$C_1$–$C_4$-alkoxy, benzoyloxy, o-, m- or p-methylbenzoyloxy, o-, m- or p-chlorobenzoyloxy, $C_1$–$C_8$-alkoxyalkanoyloxy, phenoxyalkanoyloxy, $C_1$–$C_8$-alkoxycarbonyloxy, $C_1$–$C_8$-alkoxyalkoxycarbonyloxy, benzyloxycarbonyloxy, phenethyloxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl, phenoxy-$C_1$–$C_4$-alkoxy or phenethyloxycarbonyl, or is phenyl, benzyl, phenethyl or cyclohexyl.

Specific examples of radicals $R^2$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxyporpyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonyloxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2--phenylethoxycarbonylethyl, 2-methoxyethoxycarbonylethyl, 2-ethoxyethoxy-carbonylethyl, 2-propoxyethoxycarbonyleythyl, 2-butoxyethoxycarbonylethyl, 2-phenoxyethoxycarbonylethyl and 2-benzoylethyl.

Specific examples of radicals R in addition to those stated above are phenyl, o-, m- and p-methylphenyl, o-, m- and p-ethylphenyl, o-, m- and p-methoxyphenyl, o-, m- and p-ethoxyphenyl, o-, m- and p-chlorophenyl, o-, m- and p-acetylaminophenyl, o-, m- and p-bromophenyl, o-, m- and p-nitrophenyl, $(CH_3)_2C_6H_3$, $(C_2H_5)_2C_6H_3$, $Cl_2C_6H_3$, o- m- and p-propionylaminophenyl, o-, m- and p-butyrylaminophenyl, o-, m- and p-$\beta$-cyanoethoxyphenyl, methyl, ethyl, n- and isopropyl, n-, iso- and sec.-butyl, allyl, methallyl, furyl and thienyl.

The compounds of the formula I have red to blue hues and are particularly useful for dyeing polyesters, nylons, cellulose esters and blends of polyesters and cellulose fibers. As a rule, the dyeings obtained have good or very good fastness properties, particularly on polyesters.

The compounds of the formula I can be prepared by reacting a diazonium compound of an amine of the formula

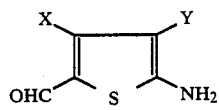

with a compound of the formula

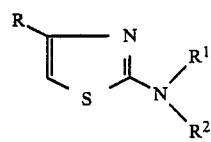

by a conventional method. The Examples which follow illustrate the preparation. Parts and percentages are by weight, unless stated otherwise.

Of particular importance are compounds of the formula Ia

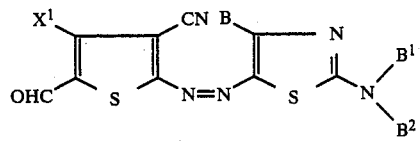

where $X^1$ is hydrogen or $C_1$-$C_4$-alkyl, or is thienyl, furyl or phenyl which is unsubstituted or substituted by methyl, ethyl, methoxy, ethoxy, chlorine, bromine, nitro or acylamino, B is phenyl which is unsubstituted or substituted by chlorine, bromine, $C_1$-$C_4$-alkoxy, -cyanoethoxy, methyl, ethyl or $C_1$-$C_4$-alkanoylamino, and $B^1$ and $B^2$ independently of one another are each benzyl, phenylethyl, cyclohexyl, allyl, chloroallyl, phenyl or $C_1$-$C_4$-alkyl which is unsubstituted or substituted by hydroxyl, cyano, $C_1$-$C_4$-alkoxy, $C_1$-$C_8$-alkoxycarbonyl, $C_1$-$C_8$-alkanoyloxy, $C_1$-$C_4$-alkoxycarbonyloxy or $C_1$-$C_4$-alkylaminocarbonyloxy, and one of the radicals $B^1$ or $B^2$ may furthermore be hydrogen.

EXAMPLE 1

21.6 parts of 2-amino-3-cyano-4-phenyl-5-formylthiophene were introduced into a mixture of 150 parts of 3:1 glacial acetic acid/propionic acid and 70 parts of 85% strength sulfuric acid. 32 parts of nitrosylsulfuric acid (11.5% of $N_2O_3$) were added dropwise at 0°–5° C., after which the mixture was stirred for 4 hours at this temperature.

24.0 parts of 2-diethylamino-4-phenyl-thiazole were dissolved in 100 parts of dimethylformamide, and the solution was introduced into 400 parts of ice and 2 parts of amidosulfonic acid. The diazo solution obtained previously was added in the course of 2 hours with external cooling with ice/water, and the mixture was stirred overnight without further cooling. The product was filtered off under suction, washed neutral with water and dried at 80° C. in a drying oven under reduced pressure to give 40 parts of a bluish black powder of the formula

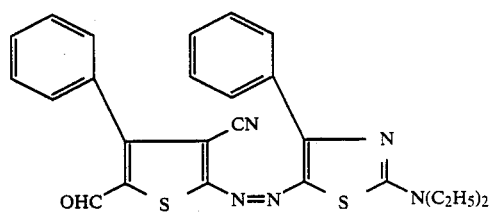

which dyes polyester fabric in fast royal blue hues.

If 23.9 parts of 2-diethylamino-4-(2'-thienyl)-thiazole are used instead of 24 parts of 2-diethylamino-4-phenyl-thiazole and the procedure described above is followed, 42 arts of a bluish black powder are obtained, this powder dyeing polyester fibers in fast greenish-blue hues.

The dyes defined in the Table below are also obtained in a similar manner.

| Example | D | K | Hue on polyester |
|---|---|---|---|
| 2 | | | blue |
| 3 | | | greenish blue |

-continued

| Example | D | K | Hue on polyester |
|---|---|---|---|
| 4 | 3-phenyl-4-CN-5-CHO-thiophene | 4-phenyl-5-methyl-thiazole with =N-N(CH₃)(C₂H₅) | blue |
| 5 | 3-phenyl-4-CN-5-CHO-thiophene | 4-phenyl-5-methyl-thiazole with =N-N(C₄H₉)₂ | blue |
| 6 | 3-phenyl-4-CN-5-CHO-thiophene | 4-phenyl-5-methyl-thiazole with =N-N(C₂H₄CN)(C₂H₅) | reddish blue |
| 7 | 3-phenyl-4-CN-5-CHO-thiophene | 4-(3-methylthien-2-yl)-5-methyl-thiazole with =N-N(C₂H₅)₂ | greenish blue |
| 8 | 3-phenyl-4-CN-5-CHO-thiophene | 4-(4-chlorophenyl)-5-methyl-thiazole with =N-N(C₂H₅)₂ | blue |
| 9 | 3-phenyl-4-CN-5-CHO-thiophene | 4-(4-acetamidophenyl)-5-methyl-thiazole with =N-N(C₂H₅)₂ | greenish blue |
| 10 | 3-phenyl-4-CN-5-CHO-thiophene | 4-phenyl-5-methyl-thiazole with =N-morpholino | greenish blue |

-continued

D—N=N—K

| Example | D | K | Hue on polyester |
|---|---|---|---|
| 11 | 4-Cl-C6H4, CN, OHC, S, CH3 (thiophene) | phenyl-thiazole with N(C2H5)(C2H4CN) | blue |
| 12 | 4-Cl-C6H4, CN, OHC, S, CH3 (thiophene) | thienyl-thiazole with N(C2H5)2 | green |
| 13 | 4-Cl-C6H4, CN, OHC, S, CH3 (thiophene) | 4-H3CO-C6H4-thiazole with N(C2H5)2 | greenish blue |
| 14 | 4-H3C-C6H4, CN, OHC, S, CH3 (thiophene) | phenyl-thiazole with N(C2H5)2 | blue |
| 15 | 4-H3C-C6H4, CN, OHC, S, CH3 (thiophene) | 4-H3CO-C6H4-thiazole with N(C2H5)2 | greenish blue |
| 16 | 4-H3C-C6H4, CN, OHC, S, CH3 (thiophene) | thienyl-thiazole with N(C2H5)2 | greenish blue |
| 17 | 4-H3CO-C6H4, CN, OHC, S, CH3 (thiophene) | phenyl-thiazole with N(C2H5)2 | greenish blue |

-continued

D—N=N—K

| Example | D | K | Hue on polyester |
|---|---|---|---|
| 18 | 4-H₃CO-C₆H₄ substituted thiophene with CN, OHC, and CH₃ groups | 4-(H₃COCHN)-C₆H₄ substituted thiazole with N(C₂H₅)₂ amidine | greenish blue |
| 19 | 4-H₃CO-C₆H₄ substituted thiophene with CN, OHC, and CH₃ groups | 4-Cl-C₆H₄ substituted thiazole with N(C₂H₅)₂ amidine | greenish blue |
| 20 | 4-H₃CO-C₆H₄ substituted thiophene with CN, OHC, and CH₃ groups | 4-H₃CO-C₆H₄ substituted thiazole with N(C₂H₅)₂ amidine | greenish blue |
| 21 | 3-CH₃, 2-OHC, 4-CN, 5-CH₃ thiophene | phenyl-substituted thiazole with N(C₂H₅)₂ amidine | blue |
| 22 | 3-CH₃, 2-OHC, 4-CN, 5-CH₃ thiophene | 4-CH₃-C₆H₄ substituted thiazole with N(C₂H₅)₂ amidine | blue |
| 23 | 3-CH₃, 2-OHC, 4-CN, 5-CH₃ thiophene | 4-Cl-C₆H₄ substituted thiazole with N(C₂H₅)₂ amidine | blue |
| 24 | 3-CH₃, 2-OHC, 4-CN, 5-CH₃ thiophene | 2-thienyl substituted thiazole with N(C₂H₅)₂ amidine | blue |

-continued

| Example | D | K | Hue on polyester |
|---|---|---|---|
| 25 | 3-ethyl-4-cyano-5-methyl-2-formylthiophene | 2-(thien-2-yl)-5-methyl-N,N-diethylthiazol-2-ylidene | blue |
| 26 | 3-ethyl-4-cyano-5-methyl-2-formylthiophene | 4-phenyl-5-methyl-N,N-diethylthiazol-2-amine | blue |
| 27 | 3-ethyl-4-cyano-5-methyl-2-formylthiophene | 4-(4-methoxyphenyl)-5-methyl-N,N-diethylthiazol-2-amine | blue |
| 28 | 3-ethyl-4-cyano-5-methyl-2-formylthiophene | 4-phenyl-5-methyl-N,N-diethylthiazol-2-amine | blue |
| 29 | 3-ethyl-4-cyano-5-methyl-2-formylthiophene | 4-(3,5-dimethylthien-2-yl)-5-methyl-N,N-diethylthiazol-2-amine | blue |
| 30 | 3-ethyl-4-cyano-5-methyl-2-formylthiophene | 4-phenyl-5-methyl-N-ethyl-N-butylthiazol-2-amine | blue |
| 31 | 3-butyl-4-cyano-5-methyl-2-formylthiophene | 4-(4-chlorophenyl)-5-methyl-N,N-dimethylthiazol-2-amine | blue |

-continued

D—N=N—K

| Example | D | K | Hue on polyester |
|---|---|---|---|
| 32 | 3-C$_4$H$_9$, 4-CN, 5-CHO, 2-CH$_3$ thiophene (D group) | 4-phenyl-5-methyl-2-(N,N-diethylamino)thiazole | blue |
| 33 | 3-C$_4$H$_9$, 4-CN, 5-CHO, 2-CH$_3$ thiophene | 4-(2-thienyl)-5-methyl-2-(N,N-diethylamino)thiazole | blue |
| 34 | 3-C$_8$H$_{17}$, 4-CN, 5-CHO, 2-CH$_3$ thiophene | 4-(4-acetamidophenyl)-5-methyl-2-(N,N-diethylamino)thiazole | blue |
| 35 | 3-C$_8$H$_{17}$, 4-CN, 5-CHO, 2-CH$_3$ thiophene | 4-phenyl-5-methyl-2-(N,N-diethylamino)thiazole | blue |
| 36 | 3-C$_8$H$_{17}$, 4-CN, 5-CHO, 2-CH$_3$ thiophene | 4-(2-thienyl)-5-methyl-2-(N,N-diethylamino)thiazole | blue |
| 37 | 3-CH$_2$OCH$_3$, 4-CN, 5-CHO, 2-CH$_3$ thiophene | 4-(5-chloro-2-thienyl)-5-methyl-2-(N,N-dimethylamino)thiazole | blue |
| 38 | 3-CH$_2$Cl, 4-CN, 5-CHO, 2-CH$_3$ thiophene | 4-(5-chloro-2-thienyl)-5-methyl-2-(N,N-dimethylamino)thiazole | blue |

-continued

D—N=N—K

| Example | D | K | Hue on polyester |
|---------|---|---|------------------|
| 39 | (benzyl, CN, OHC, thiophene-S) | (thiophene-S, N, C₂H₅, C₂H₅, S) | blue |
| 40 | (phenyl, CO₂CH₃, OHC, thiophene-S) | (phenyl, N, C₂H₅, C₂H₅, S) | blue |
| 41 | (phenyl, CO₂C₄H₉, OHC, thiophene-S) | (phenyl, N, C₂H₅, C₂H₅, S) | blue |
| 42 | (H₃C, CO₂C₆H₁₃, OHC, thiophene-S) | (phenyl, N, C₂H₅, C₂H₅, S) | violet |
| 43 | (H₃C, CO₂C₆H₁₃, OHC, thiophene-S) | (H₃CO-phenyl, N, C₂H₅, C₂H₅, S) | blue |
| 44 | (benzyl CH₂, CO₂CH₃, OHC, thiophene-S) | (H₃CO-phenyl, N, C₂H₅, C₂H₅, S) | blue |
| 45 | (OCH₃O(CH₂)₂, CO₂C₂H₅, OHC, thiophene-S) | (thiophene-S, N, C₂H₅, C₂H₅, S) | blue |

-continued

D—N=N—K

| Example | D | K | Hue on polyester |
|---|---|---|---|
| 46 | 3-formyl-4-cyano-5-methylthiophene | 4-(1-phenylethylidene)-2-(N,N-diethylamino)thiazole | blue |
| 47 | 3-formyl-4-cyano-5-methylthiophene | 4-[1-(4-methoxyphenyl)ethylidene]-2-(N,N-diethylamino)thiazole | blue |
| 48 | 3-formyl-4-cyano-5-methylthiophene | 4-[1-(2-thienyl)ethylidene]-2-(N,N-diethylamino)thiazole | blue |
| 49 | 3-formyl-4-methylsulfonyl-2,5-dimethylthiophene | 4-(1-phenylethylidene)-2-(N-ethyl-N-butylamino)thiazole | blue |
| 50 | 3-formyl-4-methylsulfonyl-2,5-dimethylthiophene | 4-[1-(3-methylphenyl)ethylidene]-2-[N,N-di(allyl)amino]thiazole | blue |
| 51 | 3-formyl-4-cyano-5-methylthiophene | 4-(1-phenylethylidene)-2-(N,N-dimethylamino)thiazole | blue |
| 52 | 3-formyl-4-methylsulfonylthiophene | 4-(1-phenylethylidene)-2-(N,N-dimethylamino)thiazole | blue |

-continued

D—N=N—K

| Example | D | K | Hue on polyester |
|---|---|---|---|
| 53 | 3-methyl-4-(COOCH₃)-5-CHO-thiophene | 4-phenyl-5-methyl-2-(N,N-diethylamino)thiazole | blue |
| 54 | 3-methyl-4-(CON(CH₃)₂)-5-CHO-thiophene | 4-phenyl-5-methyl-2-(N,N-diethylamino)thiazole | blue |
| 55 | 3-methyl-4-(COCH₃)-5-CHO-thiophene | 4-phenyl-5-methyl-2-(N,N-diethylamino)thiazole | bluish violet |
| 56 | 4-(COOC₄H₉)-5-CHO-thiophene (3-methyl) | 4-phenyl-5-methyl-2-(N,N-diethylamino)thiazole | blue |
| 57 | 4-(CON(CH₃)₂)-5-CHO-thiophene (3-methyl) | 4-phenyl-5-methyl-2-(N,N-diethylamino)thiazole | blue |
| 58 | 4-(COCH₃)-5-CHO-thiophene (3-methyl) | 4-phenyl-5-methyl-2-(N,N-diethylamino)thiazole | blue |
| 59 | 4-(COCH₃)-5-CHO-thiophene (3-methyl) | 4-(2-thienyl)-5-methyl-2-(N,N-diethylamino)thiazole | blue |

| Example | D | K | Hue on polyester |
|---|---|---|---|
| 60 | O₂N, CN, OHC, S | phenyl-thiazole-N(C₂H₅)₂ | greenish blue |
| 61 | H₃C, CN, OHC, S | CH₃CONH-phenyl-thiazole-N(C₂H₅)₂ | blue |
| 62 | phenyl, CN, OHC, S | O₂N-phenyl-thiazole-N(C₂H₅)₂ | blue |
| 63 | phenyl, CN, OHC, S | 2,4-(CH₃)₂-phenyl-thiazole-N(C₂H₅)₂ | blue |
| 64 | phenyl, CN, OHC, S | 3,4-Cl₂-phenyl-thiazole-N(C₂H₅)₂ | blue |
| 65 | phenyl, CN, OHC, S | 3,4-(CH₃O)₂-phenyl-thiazole-N(C₂H₅)₂ | blue |

We claim:
1. A compound of the formula I

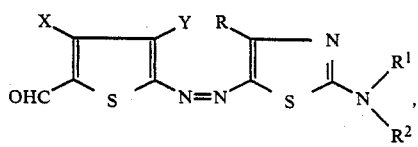

where X is hydrogen, nitro or unsubstituted or substituted alkyl, alkenyl, cycloalkyl, aryl or hetaryl, Y is cyano, nitro, alkanoyl, aroyl, alkylsulfonyl, arylsulfonyl, carboxyl, a carboxylic ester group or unsubstituted or substituted carbamyl, R is unsubstituted or substituted alkyl or aryl, $R^1$ is hydrogen or $R^2$, and $R^2$ is unsubstituted or substituted alkyl, alkenyl, cycloalkyl, aralkyl or aryl.

2. A compound as claimed in claim 1, of the formula

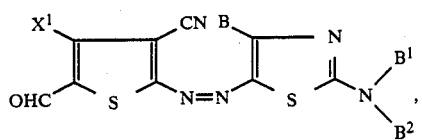

where $X^1$ is hydrogen or $C_1$-$C_4$-alkyl or is thienyl, furyl or phenyl which is unsubstituted or substituted by methyl, ethyl, methoxy, ethoxy, chlorine, bromine, nitro or acylamino, B is phenyl which is unsubstituted or substituted by chlorine, bromine, $C_1$-$C_4$-alkoxy, -cyanoethoxy, methyl, ethyl or $C_1$-$C_4$-alkanoylamino, and $B^1$ and $B^2$ independently of one another are each benzyl, phenylethyl, cyclohexyl, allyl, chloroallyl, phenyl or $C_1$-$C_4$-alkyl which is unsubstituted or substituted by hydroxyl, cyano, $C_1$-$C_4$-alkoxy, $C_1$-$C_8$-alkoxycarbonyl, $C_1$-$C_8$-alkanoyloxy, $C_1$-$C_4$-alkoxycarbonyloxy or $C_1$-$C_4$-alkylaminocarbonyloxy, and one of the radicals $B^1$ or $B^2$ may furthermore be hydrogen.

3. The compound of claim 1 wherein X is hydrogen, nitro, $C_1$-$C_8$ alkyl which may be substituted by chlorine, bromine, or phenyl; or phenyl which is unsubstituted or substituted by nitro chlorine, bromine, methyl, ethyl, methoxy or ethoxy.

4. The compound of claim 1 wherein Y is cyano, carboxyl, a carboxylic ester group, alkylsulfonyl, $CON(CH_3)_2$, or $COCH_3$.

5. The compound of claim 1, wherein R is a phenyl which is unsubstituted, mono-substituted or poly-substituted by chlorine, bromine, methyl, nitro, methoxy or $NHCOCH_3$.

6. The compound of claim 1 wherein $R_1$ is hydrogen, or a $C_1$-$C_4$ alkyl which is unsubstituted or substituted by cyano.

7. The compound of claim 1 wherien X is methyl, Y is cyano, R is phenyl and $R_1$ and $R_2$ are each ethyl.

8. The compound of claim 1 wherein X is hydrogen, Y is cyano, R is phenyl and $R_1$ and $R_2$ are each ethyl.

* * * * *